Patton & Fergus,
Saw.

Nº 9,720.   Patented May 10, 1853.

UNITED STATES PATENT OFFICE.

JAS. M. PATTON AND WM. F. FERGUS, OF PHILADELPHIA, PENNSYLVANIA, ASSIGNORS TO JNO. C. DA COSTA.

TONGUING AND GROOVING AND MOLDING CUTTER.

Specification of Letters Patent No. 9,720, dated May 10, 1853.

*To all whom it may concern:*

Figure 3:
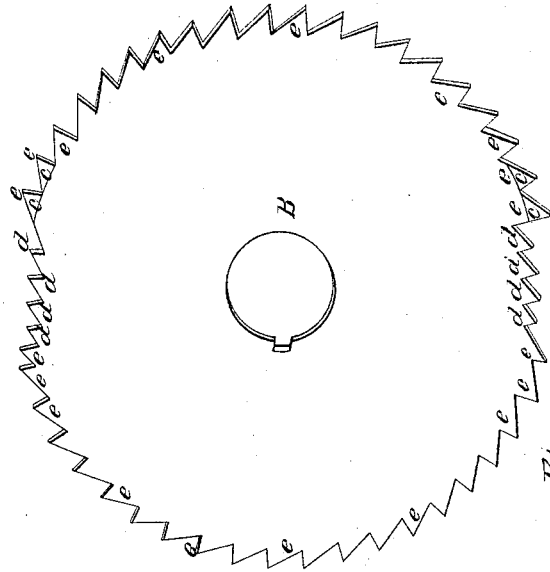
Figure 4:
Figure 1:
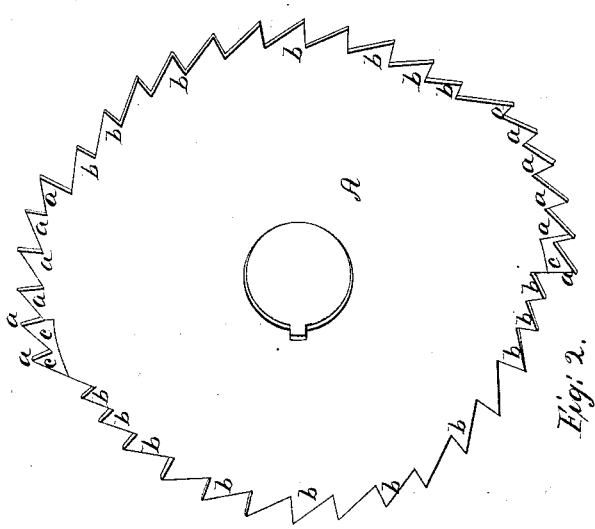
Figure 2:
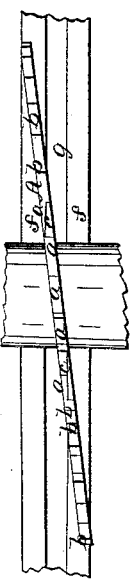

Be it known that we, JAMES M. PATTON and WM. F. FERGUS, of the city and county of Philadelphia and State of Pennsylvania, have invented a new and Improved Instrument for Tonguing, Grooving, and Dressing Irregular Faces; and we do hereby declare that the following is a full and exact description thereof, reference being had to the accompanying drawings, making a part of this specification, Figure 1 being a side view of our said instrument adapted to the cutting of grooves, and Fig. 2 an edge view of the same and of a portion of a board grooved; Fig. 3, a side view of the said instrument adapted to the forming of tongues, and Fig. 4 an edge view of the same and of a portion of a board tongued thereby.

The nature of our invention consists in arranging series of cutting teeth—for forming a tongue, groove, or molding—on the periphery of a generally elliptical plate inclined to the axis of its rotation, so that, as the said plate is rotated, the cutting teeth upon its periphery shall correspond in reverse to the tongue, groove, or molding to be formed thereby.

The double series of cutting teeth $b, b$, on opposite edges of the plate A, are on the peripheries of segments of the same ellipse, and the said plate is sufficiently inclined to cause all the said teeth to be exactly equidistant from the axis of rotation; and thereby cause them to dress the faces of the lips $f, f$, at the sides of the groove $g$.

The double series of cutting teeth $a, a$, placed between the double series of teeth $b, b$, are also on the peripheries of segments of an ellipse of a large size, but parallel—or nearly so—with the ellipse, before mentioned. This causes all the cutters $a, a$,—in both series—to project the same distance from the axis of rotation, and to cut at a greater distance from the said axis, than the double series of teeth $b, b$; and thereby to form the groove $g$, while the teeth $b, b$, are dressing the lips $f, f$, at the sides of the same.

To enable the teeth $a, a$, to smoothly dress the sides of the groove, a portion $c, c$, of the said teeth—situated next to the double series of teeth $b, b$,—are jointed off on their sides, as shown in the drawings.

The double series of cutting teeth $e, e$, on opposite edges of the plate B, Fig. 3, surmount segments of an ellipse, and between the said segments, recesses $d, d$, are formed in the said plate: (the plate B, is so inclined to its axis of rotation, as to cause all the teeth in both series to be equidistant from the said axis:) whereby each of the said series of teeth $e, e$, will have a distinct and divided action, which enables them to dress off the sides $i, i$, and leave the tongue $h$, projecting between them. The said recesses in the plate B, between the segments of the ellipse surmounted by the double series of teeth $e, e$, are shaped into curves or the segments of an ellipse which is parallel with the aforesaid larger ellipse: and on the peripheries of the said recess segments, double series of teeth $d, d$, are formed, which dress off the edge of the tongue $h$.

To enable the sides of the tongue to be dressed off smoothly, a portion $c, c$, of the teeth $e, e$, at the extremity of one or both series of the said teeth, are dressed off at their sides, as shown and illustrated in the drawings.

When it is desired to construct a tool or instrument for the formation of moldings upon the principles before stated, it is merely necessary to give such a shape to the periphery of a plate, inclined to the axis of rotation, that when it is turned or rotated on said axis, the cutting teeth upon its periphery will describe paths exactly the reverse of those desired to be given to the molding to be formed thereby. Our said improved cutting instruments, we propose to use for dressing stone, as well as wood.

What we claim as our invention and desire to secure by Letters Patent, is—

Arranging the cutting teeth on the periphery of a plate, inclined to the axis of its rotation, so that, as they are rotated, they shall correspond in reverse to the tongue and groove, or molding, to be formed thereby, in the manner substantially as herein described.

The above specification of our improved instrument for tonguing, grooving and dressing irregular surfaces signed by us this sixteenth day of June, 1852.

JAS. M. PATTON. [L. S.]
WM. F. FERGUS. [L. S.]

Witnesses:
SAMUEL TAYLER,
E. V. EVERHART.